(12) United States Patent
Verbeke et al.

(10) Patent No.: US 11,539,762 B2
(45) Date of Patent: Dec. 27, 2022

(54) CONFERENCING BASED ON DRIVER STATE AND CONTEXT

(71) Applicant: HARMAN INTERNATIONAL INDUSTRIES, INCORPORATED, Stamford, CT (US)

(72) Inventors: Joseph Verbeke, San Francisco, CA (US); Evgeny Burmistrov, Saratoga, CA (US); Stefan Marti, Oakland, CA (US); Priya Seshadri, San Francisco, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/064,492

(22) Filed: Oct. 6, 2020

(65) Prior Publication Data

US 2022/0109705 A1 Apr. 7, 2022

(51) Int. Cl.
*H04L 65/1083* (2022.01)
*H04L 65/1076* (2022.01)
*H04L 65/1059* (2022.01)
*H04L 65/1069* (2022.01)

(52) U.S. Cl.
CPC ...... *H04L 65/1083* (2013.01); *H04L 65/1059* (2013.01); *H04L 65/1069* (2013.01); *H04L 65/1076* (2013.01)

(58) Field of Classification Search
CPC .......... H04L 65/1083; H04L 65/1059; H04L 65/1069; H04L 65/1076
See application file for complete search history.

(56) References Cited

U.S. PATENT DOCUMENTS

| 6,151,619 | A | * | 11/2000 | Riddle | ................. H04L 65/403 709/204 |
|---|---|---|---|---|---|
| 9,298,994 | B2 | | 3/2016 | Marti et al. | |
| 9,820,108 | B1 | * | 11/2017 | Inciong | ............. H04M 1/72451 |
| 9,884,628 | B1 | * | 2/2018 | Grant | .................... B60W 40/08 |
| 10,399,575 | B2 | | 9/2019 | Spasojevic et al. | |
| 10,655,978 | B2 | | 5/2020 | Marti et al. | |
| 10,850,746 | B2 | | 12/2020 | Marti et al. | |
| 10,967,871 | B1 | | 4/2021 | Marti et al. | |
| 2011/0264742 | A1 | * | 10/2011 | Lapstun | .............. H04L 12/1827 709/204 |
| 2016/0267335 | A1 | * | 9/2016 | Hampiholi | ............. B60K 28/06 |
| 2016/0269521 | A1 | * | 9/2016 | Mendiratta | ....... H04M 3/42042 |
| 2018/0009442 | A1 | * | 1/2018 | Spasojevic | ........... A61B 5/4064 |
| 2018/0196583 | A1 | * | 7/2018 | Astavans | ............... G06V 20/40 |
| 2020/0213560 | A1 | * | 7/2020 | Zhang | ................... G06V 40/70 |
| 2021/0276568 | A1 | | 9/2021 | Verbeke et al. | |

(Continued)

OTHER PUBLICATIONS

U.S. Appl. No. 16/839,056, filed Apr. 2, 2020, 44 pages.
(Continued)

*Primary Examiner* — William G Trost, IV
*Assistant Examiner* — Monishwar Mohan
(74) *Attorney, Agent, or Firm* — Artegis Law Group, LLP (57) ABSTRACT

Embodiments of the present disclosure sets forth a computer-implemented method comprising obtaining sensor data associated with a driver of a vehicle, determining a state associated with the driver based on the sensor data, and transmitting the state associated with the driver to a teleconference session, wherein the driver is at least one of a participant or an invitee to the teleconference session.

19 Claims, 7 Drawing Sheets

(56) References Cited

U.S. PATENT DOCUMENTS

2021/0287697 A1    9/2021   Marti et al.
2021/0309252 A1   10/2021   Boulanger et al.

OTHER PUBLICATIONS

U.S. Appl. No. 17/195,493, filed Mar. 8, 2021, 44 pages.
U.S. Appl. No. 16/820,533, filed Mar. 16, 2020, 45 pages.
U.S. Appl. No. 16/810,760, filed Mar. 5, 2020, 36 pages.

* cited by examiner

CONFERENCING BASED ON DRIVER STATE AND CONTEXT

BACKGROUND

Field of the Various Embodiments

The various embodiments relate generally to driver assistance systems, and more specifically, to conferencing based on driver state and context.

Description of the Related Art

The rise of teleconferencing technologies has extended the sphere of productivity beyond the workplace. With the aid of telephones, conferencing systems, and the like, a user can participate in a teleconference just about anywhere, including in the home and even while driving a vehicle.

When a person participates in a teleconference using conventional teleconferencing techniques, the people in the teleconference typically receive just the voice of person participating in the teleconference. During a typical teleconference, while the other activities of the person participating in the teleconference may be of interest to the other people in the teleconference, this information is not typically available unless the person participating in the teleconference informs the other people in the teleconference or background sounds provide hints to the other people in the teleconference. In most cases, the person participating in the teleconference has significant control over their distraction level, so that distractions from the teleconference can be managed.

When the person participating in the teleconference is also driving a vehicle, the person participating in the teleconference may not have adequate control over their distraction level. The driver of the vehicle has the dual burden of driving the vehicle and participating in the teleconference, and may enter into driving scenarios that distract the driver from the ability to participate in the teleconference while safely driving the vehicle. However, a drawback of conventional teleconferencing techniques is that the other people participating in the teleconference have no way of knowing whether the driver is currently distracted from the teleconference or whether the driver can currently handle the burden of concurrently participating in the teleconference and driving the vehicle. The other people participating in the teleconference do not know if the driver is distracted unless the driver discloses such information, which interrupts the continuity of the teleconference and accordingly detracts from the teleconference experience. In addition, many drivers may be too distracted by driving to disclose this to the other people participating in the teleconference or may be unwilling to indicate that they are being distracted from the teleconference.

As the foregoing illustrates, what is needed are more effective techniques for conferencing while a participant in the teleconference is driving a vehicle.

SUMMARY

One embodiment sets forth a computer-implemented method comprising obtaining sensor data associated with a driver of a vehicle, determining a state associated with the driver based on the sensor data, and transmitting the state associated with the driver to a teleconference session, wherein the driver is at least one of a participant or an invitee to the teleconference session.

One embodiment sets forth a computer-implemented method comprising obtaining sensor data associated with a driver of a vehicle, determining a state associated with the driver based on the sensor data, receiving a teleconference request, and responding to the teleconference request based on the state associated with the driver.

Further embodiments provide, among other things, one or more computer-readable media and system configured to implement the methods set forth above.

At least one advantage of the disclosed techniques is that information indicating a state and/or context of a vehicle driver who is also participating in a teleconference can be communicated to other people participating in the teleconference. Accordingly, the other people can adjust expectations for the teleconference or abort the teleconference based on the state and context of the driver.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
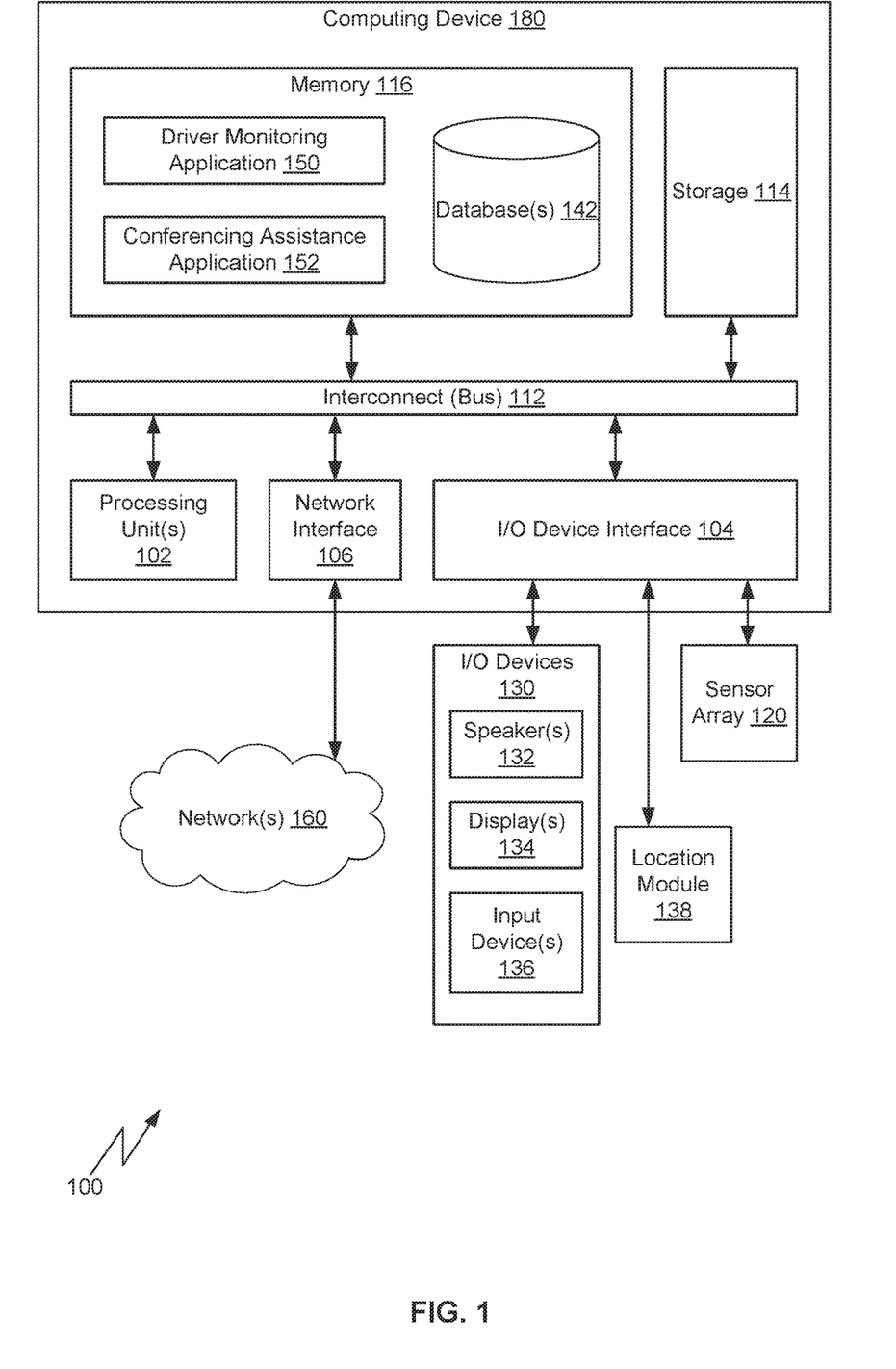
FIG. 1 illustrates a block diagram of a computing system configured to implement one or more aspects of the various embodiments.

FIG. 1 illustrates a block diagram of computing system 100 configured to implement one or more aspects of the various embodiments. As shown, computing system 100 includes, without limitation, computing device 180, sensor array 120, input/output (I/O) device(s) 130, location module 138, and network 160. Computing device 180 includes one or more processing units 102, I/O device interface 104, network interface 106, interconnect (bus) 112, storage 114, and memory 116. Memory 116 stores database(s) 142, driver monitoring application 150, and conferencing assistance application 152. Processing unit(s) 102, I/O device interface 104, network interface 106, storage 114, and memory 116 can be communicatively coupled to each other via interconnect 112.

As noted above, computing device 180 can include processing unit(s) 102 and memory 116. Computing device 180 can be a system-on-a-chip (SoC). In various embodiments, computing device 180 may be a head unit included in a vehicle system. In some embodiments, computing device 180 may be a portable computing device, such as a smartphone, tablet computer, mobile phone, media player, and so forth. Generally, computing device 180 can be configured to coordinate the overall operation of computing system 100. The embodiments disclosed herein contemplate any technically feasible system configured to implement the functionality of computing system 100 via computing device 180.

Various examples of computing device 180 include computing devices, (desktop computers, etc.), mobile devices (e.g., cellphones, smartphones, tablets, laptops, etc.), wearable devices (e.g., watches, headsets, etc.), consumer products (e.g., gaming devices, media devices, etc.), vehicle computing devices (e.g., head units, in-vehicle navigation systems), and so forth. In various embodiments, computing device 180 can be located in a road vehicle environment (e.g., consumer car, commercial truck, etc.), an aerospace and/or aeronautical environments (e.g., airplanes, helicopters, spaceships, etc.), nautical and submarine environments, and so forth. More generally, computing device 180 can be located in any vehicular environment.

Processing unit(s) 102 may include a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and/or the like. Each processing unit 102 generally comprises a programmable processor that executes program instructions to manipulate input data. In some embodiments, processing unit(s) 102 may include any number of processing cores, memories, and other modules for facilitating program execution. In some embodiments, processing unit(s) 102 can be configured to execute driver monitoring application 150 to provide driver monitoring services and conferencing assistance application 152 to provide conferencing assistance services. In some embodiments, driver monitoring application 150 determines driver state(s) and/or context(s) based on sensor data and provides the driver state(s) and/or context(s) to conferencing assistance application 152. In some embodiments, conferencing assistance application 152 uses the driver state(s) and/or contexts to provide conferencing assistance services including, for example, generating driver state and/or context information and communicating that information, or responding to teleconference requests based on driver state and/or context.

Storage 114 can include non-volatile storage for applications, software modules, and data, and can include fixed or removable disk drives, flash memory devices, and CD-ROM, DVD-ROM, Blu-Ray, HD-DVD, or other magnetic, optical, solid state storage devices, and/or the like. For example, conferencing assistance application 152, driver monitoring application 150, and database(s) 142 could be stored in storage 114, and then loaded into memory 116 as needed.

Memory 116 can include a memory module or collection of memory modules. Memory 116 generally comprises storage chips such as random access memory (RAM) chips that store application programs and data for processing by processing unit 102. Processing unit(s) 102, I/O device interface 104, and network interface 106 can be configured to read data from and write data to memory 116. Driver monitoring application 150 and conferencing assistance application 152 can be loaded from storage 114 into memory 116. While in memory 116, driver monitoring application 150 and conferencing assistance application 152 can be executed by processing unit(s) 102 to implement the functionality described in the present disclosure.

Database(s) 142 can store values and other data retrieved or computed by processing unit(s) 102 to coordinate the operation of driver monitoring application 150 and conferencing assistance application 152. Database(s) 142 may be stored in storage 114 and loaded into memory 116 as needed. In various embodiments, processing unit(s) 102 may be configured to store data and/or information (e.g., values, computed ratings or scores, generated information) associated with driver state and/or context in database(s) 142 and/or retrieve data and/or information stored in database(s) 142. For example, database(s) 142 could store historical driver state values, face recognition information, person identification information, lookup tables, driver state and/or context algorithms (e.g., affective-cognitive load algorithms), driver state and/or context thresholds, mappings of sensor values to driver state and/or context metrics, mappings of driver state and/or context values to driver distraction ratings or scores, information associated with external conferencing applications and associated application programming interfaces (APIs), and so forth. In some embodiments, database(s) 142 may receive periodic updates for at least a portion of the data stored in database(s) 142 (e.g., updates to lookup tables, mappings, and/or algorithms) from a remote computing system (e.g., a cloud computing system or a remote server system) via network interface 106 and network 160.

Sensor array 120 includes one or more sensor devices that perform measurements and/or acquire data related to certain subjects in an environment. In various embodiments, sensor array 120 can generate sensor data associated with a state and/or context of a driver of a vehicle. For example, sensor array 120 could collect biometric data related to the driver (e.g., heart rate, brain activity, skin conductance, blood oxygenation, pupil size, eye motion, galvanic skin response, blood-pressure level, average blood glucose concentration, etc.). Additionally or alternatively, sensor array 120 can generate sensor data associated with a cabin of the vehicle. For example, sensor array 120 could generate sensor data about the presence of other occupants in the vehicle, the environment within the cabin of the vehicle, operation of the vehicle, and so forth. In some embodiments, sensor array 120 can be coupled to and/or included within computing device 180 and send sensor data to processing unit(s) 102. Processing unit(s) 102 execute driver monitoring application 150 in order to determine driver states and/or contexts that are derived from the acquired sensor data.

In various embodiments, sensor array 120 may acquire sensor data that driver monitoring application 150 processes in order to classify an emotion or emotional state that the driver is experiencing. For example, sensor array 120 could include a driver-facing camera that records the face and/or the eyes of the driver as image data. Driver monitoring application 150 could then analyze the image data in order to determine the facial expression of the user, and then map the facial expression to an emotional state. In another example, sensor array 120 could include sensors in various parts of the vehicle (e.g., driver seat, steering wheel, etc.) that acquire biological and/or physiological signals of the driver of the vehicle (e.g., perspiration, heart rate, heart-rate variability (HRV), blood flow, blood-oxygen levels, breathing rate, galvanic skin response (GSR), sounds created by a user, behaviors of a user, etc.). In such instances, driver monitoring application 150 could compute one or more quantitative emotional parameterized metrics, such as emotional arousal (A), emotional valence (V), and/or emotional dominance that indicate the emotion the user is experiencing.

In various embodiments, sensor array 120 may also acquire data that driver monitoring application 150 can process in order to compute a cognitive load that a user is experiencing. For example, sensor array 120 could include a pupil sensor (e.g., a camera focused on the eyes of the driver) that acquires image data about at least one pupil of the driver. Driver monitoring application 150 could then perform various pupillometry techniques to detect eye parameters (e.g., fluctuations in the pupil diameter of the driver, gaze direction of the pupil, eye lid position, etc.) in order to estimate a cognitive load of the driver. In another example, sensor array 120 could include heart rate sensors and/or other biometric sensors that acquire biological and/or physiological signals of the driver (e.g., heart rate, breathing rate, eye motions, GSR, neural brain activity, etc.). In such instances, driver monitoring application 150 could compute the cognitive load from one or more of the acquired biological and/or physiological signals.

In various embodiments, sensor array 120 may include imaging sensors, such as RGB cameras, infrared cameras, depth cameras, and/or camera arrays, which include two or more of such cameras. Sensor array 120 may further include other sensors, including but not limited to imagers, laser sensors, ultrasound sensors, radar sensors, and/or LIDAR sensors. In some embodiments, sensor array 120 may include physical sensors, such as touch sensors, pressure sensors, position sensors (e.g., an accelerometer and/or an inertial measurement unit (IMU)), motion sensors, and so forth, that register the body positions and/or movements of the driver of the vehicle. In such instances, driver monitoring application 150 may analyze the acquired sensor data to determine the movement of the driver, and then correlate such movement with specific emotions (e.g., boredom, fatigue, arousal, etc.) and/or a cognitive load of the driver. In some embodiments, the same sensors described above can monitor the cabin of the vehicle and other occupants in the cabin, and driver monitoring application 150 can determine a context associated with the driver (e.g., presence of other occupants in the vehicle, interaction of the other occupants with the driver) based on the sensor data.

In various embodiments, sensor array 120 may include physiological sensors, such as heart-rate monitors, electroencephalography (EEG) systems, radio sensors, thermal sensors, galvanic skin response sensors (e.g., sensors that measure change in electrical resistance of skin caused by emotional stress), contactless sensor systems, magnetoencephalography (MEG) systems, and so forth. In various embodiments, driver monitoring application 150 may execute spectral entropy, weighted mean frequency, bandwidth, and/or spectral edge frequency to determine cognitive load from the acquired sensor data.

In addition, in some embodiments, sensor array 120 may include acoustic sensors, such as a microphone and/or a microphone array that acquires sound data. Such sound data may be processed by driver monitoring application 150 performing various natural language (NL) processing techniques, sentiment analysis, and/or speech analysis in order to determine the semantic meaning of the phrases spoken in the environment, determine relationships between the driver and any occupants in the vehicle, and/or infer emotional parameterized metrics from the semantic meaning. In another example, driver monitoring application 150 could analyze the acquired sound data using voice-tone analysis in order to infer emotion and or relationships from the speech signal included in the sound data. In some embodiments, driver monitoring application 150 may execute various analysis techniques relating to the spectral centroid frequency and/or amplitude of the sound signal in order to classify the sound signal to a specific value for the cognitive load.

In some embodiments, sensor array 120 may include behavioral sensors that detect the activity of the driver and occupants of the vehicle. Such behavioral sensors may include devices that acquire related activity data, such as devices that acquire application usage data and/or mobile device usage data. In such instances, driver monitoring application 150 may determine the driver state and context (e.g., driver cognitive load, driver emotional parameterized metrics, media consumption by vehicle occupants) by determining the activities in which the driver and/or other vehicle occupants are currently engaged. For example, driver monitoring application 150 could obtain media consumption and/or application usage activity from devices being used by vehicle occupants to determine vehicle occupant activity.

In some embodiments, sensor array 120 may further include one or more sensor devices configured to monitor the external environment of the vehicle. For example, sensor array 129 could include imaging devices (e.g., cameras), light sensors, LIDAR, temperature sensors, humidity sensors, air pressure sensors, and so forth.

I/O device(s) 130 may include devices capable of receiving input, such as a keyboard, a mouse, a touch-sensitive screen, a microphone and other input devices for providing input data to computing device 180. In various embodiments, I/O device(s) 130 may include devices capable of providing output, such as a display screen, one or more speakers (e.g., a loudspeaker array for spatial sound generation, ultrasound speakers for highly directional sound generation), haptic devices, touchless haptic devices (e.g., for creating haptic sensations at a distance), and/or the like. One or more of I/O devices 130 can be incorporated in computing device 180 or may be external to computing device 180. I/O devices 130 interface with computing device 180 via I/O devices interface 104. In some embodiments, computing device 180 and/or one or more I/O device(s) 130 may be components of an infotainment system implemented in a vehicle. In various embodiments, driver monitoring application 150 may determine driver state and/or context based on inputs received by one or more I/O devices 130. For example, the vehicle could include a head unit that includes a user interface. In such instances, driver monitoring application 150 could determine driver state and/or context of the driver based on one or more inputs received via the head unit.

In various embodiments, I/O devices 130 include one or more audio speakers 132, one or more display devices 134, and one or more input devices 136. Examples of display devices 134 include, without limitation, LCD displays, LED displays, heads-up displays, head-mounted displays, or touch-sensitive screens. Examples of input devices 136 include, without limitation, buttons, knobs, dials, a touchpad, a touch-sensitive screen, joysticks, or a microphone. Additionally, I/O devices 130 may include other devices capable of receiving input and/or output.

Network 160 may enable communications between computing device 180 and other devices in network via wired and/or wireless communications protocols, satellite networks, telephone networks, V2X networks, including Bluetooth, Bluetooth low energy (BLE), wireless local area network (WiFi), cellular protocols, and/or near-field communications (NFC). Network 160 is any technically feasible type of communications network that allows data to be exchanged between computing device 180 and remote systems or devices, such as a server, a cloud computing system, cloud-based storage, or other networked computing device or system. For example, network 160 could include a wide area network (WAN), a local area network (LAN), a wireless network (e.g., a Wi-Fi network, a cellular data network), and/or the Internet, among others. Computing device 180 can connect with network 160 via network interface 106. In some embodiments, network interface 106 is hardware, software, or a combination of hardware and software, that is configured to connect to and interface with network 160. In various embodiments, computing device 180 can communicate with a remote computing system providing teleconferencing systems via network 160. For example, a remote computing system (e.g., a cloud computing system) can host a teleconferencing "space," and computing device 180 can connect to that teleconferencing space via a telephone network and/or the Internet.

Location module 138 includes hardware and/or software components for determining a geographic location of computing device 180 (e.g., a current location of the vehicle). Location module 138 may determine a location of computing device 180 via acquisition of geolocation data (e.g., from a global navigation satellite system, such as a global positioning system (GPS), Glonass, Galileo, Beidou, etc.) and/or determination of location based on sensor data from sensor array 120 (e.g., dead reckoning). Location module 138 may also cross-reference an acquired and/or determined geographic location with a navigation database in database(s) 142 to determine address information corresponding to the geographic location. In some embodiments, driver monitoring application 150 can determine a driver context using the location of the vehicle.

In some embodiments, computing device 180 can pair and communicate with another computing device in proximity. That another computing device can couple to computing device 180 via I/O device interface 104 and/or network interface 106 and networks 160 using any suitable wired (e.g., USB cable) or wireless (e.g., Bluetooth, Wi-Fi) connection. Applications on computing device 180 can communicate and interface with applications on that another computing device. For example, conferencing assistance application 152 can communicate and interface with a conferencing application on that another computing device transmit information in a teleconference session.

Figure 2:
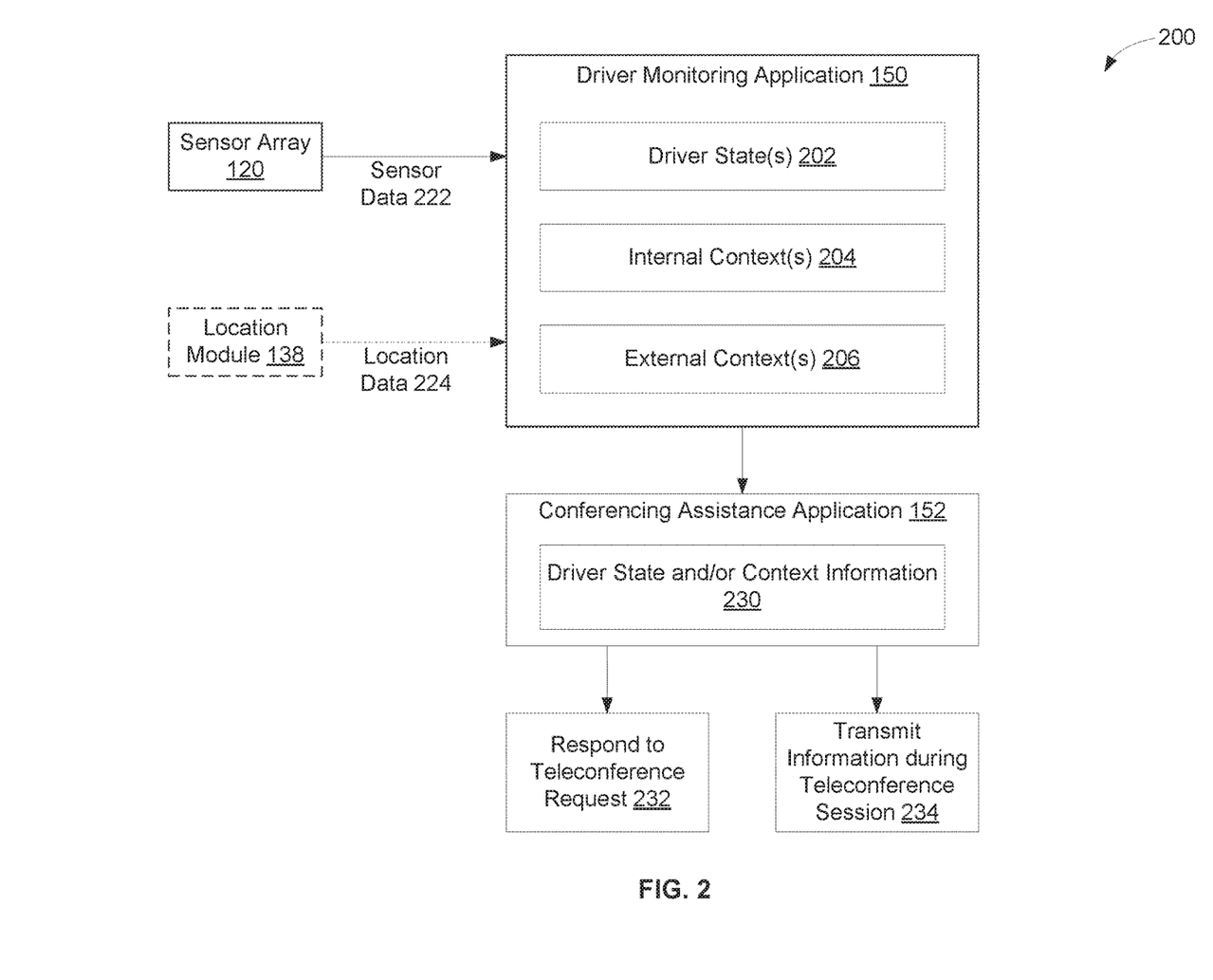
FIG. 2 illustrates a conferencing assistance sub-system included in the computing device of FIG. 1, according to various embodiments.

FIG. 2 illustrates a conferencing assistance sub-system 200 included in computing device 180, according to various embodiments. As shown, conferencing assistance sub-system 200 includes sensor array 120, driver monitoring application 150, conferencing assistance application 152, and optionally location module 138.

In operation, processing unit(s) 102 execute driver monitoring application 150, which receives sensor data 222 from sensor array 120. Driver monitoring application 150 processes sensor data 222 and determines one or more states and/or contexts associated with a driver of the vehicle based on sensor data 222. Driver monitoring application 150 can transmit the driver states and/or contexts to conferencing assistance application 152 and/or store the drier states and/or contexts in database(s) 142. In some embodiments, driver monitoring application 150 determines driver state(s) 202, an internal context(s) 204, and/or an external context(s) 206.

Driver state(s) 202 associated with the driver may include biometric values associated with a psychophysiological state of the driver of a vehicle and/or states derived or determined from the biometric values. Examples of driver states 202 can include, for example and without limitation, head orientation and eye gaze direction, eye lid state, a cognitive load that estimates an amount of brain activity that a user is employing, an affective load that estimates an emotion (specified as a pre-defined emotion or a set of emotion parameterized metrics associated with a psychophysiological state) that a user is experiencing, an affective-cognitive load, a stress level, a driving engagement level, a distraction metric, a fatigue metric, and/or the like. In various embodiments, the affective load may include one or more separate emotional metrics, such as separate arousal, valence, and/or dominance values. Additionally or alternatively, the affective load may comprise one or more discrete emotional states and/or associated values of each. Upon determining biometric values for a driver in sensor data 222, driver monitoring application 150 can combine the biometric values via one or more estimation algorithms to determine one or more driver states 202 (e.g., an affective-cognitive load (ACL) as a composite of certain biometric values, etc.).

In some embodiments, driver monitoring application 150 processes sensor data 222 to additionally determine one or more "internal" contexts 204. Internal context(s) 204 include contextual information associated with driver of the vehicle and/or the cabin of the vehicle. Examples of internal context(s) 204 include, without limitation, number of additional occupants in the vehicle, relationships of occupants with the driver (e.g., spouse, child, friend, client passenger), activities of the occupants (e.g., eating, sleeping, consuming media), sound level in the cabin, conversational situation in the cabin (e.g., who is talking to whom), media consumption in the cabin (e.g., types of content being consumed, who is consuming content, identification content being consumed), purpose of vehicle travel (e.g., commute, driving child to activity, to or from entertainment activity), or mood in the vehicle (e.g., average emotional state of occupants). More generally, internal context(s) 204 can include any contextual information associated with the occupants, activities, and/or content in the cabin that can affect an ability of the driver to participate in a teleconference while driving the vehicle.

In some embodiments, driver monitoring application 150 processes sensor data 222 to additionally determine one or more "external" contexts 206. External context(s) 206 include contextual information associated with the environment outside of the vehicle. Examples of external context(s) 206 include, without limitation, traffic density level, weather conditions, pedestrian density, detected obstacles or other imminent crash conditions, or difficulty level on the road or route (e.g., is the road empty, is the road a steep mountain road).

In some embodiments, driver monitoring application 150 can also receive location data 224, which indicates location information associated with the vehicle, from location module 138. Driver monitoring application 150 can use location data 224 as additional data to determine driver state(s) 202 (e.g., determining locations where, historically, the driver consistently experiences a high distraction level, a high cognitive load, high emotional load, high driver engagement level, and/or the like that is above a threshold), internal context(s) 204, and/or external context(s) 206.

In operation, processing unit(s) 102 execute conferencing assistance application 152 to provide conferencing assistance services, and/or interface with other applications and/or systems to provide conferencing assistance services.

Examples of conferencing assistance services include, without limitation, communication of driver state and/or context information in a teleconference session, or responding to an incoming teleconference request based on the driver state and/or context. Conferencing assistance application 152 can receive driver state(s) 202, internal context(s) 204, and/or external context(s) 206 from driver monitoring application 150 and/or database(s) 142. Conferencing assistance application 152 can generate driver state and/or context information 230 from driver state(s) 202, internal context(s) 204, and/or external context(s) 206. Driver state and/or context information 230 can be a summary, condensation, visualization, or other presentable expressions of driver state(s) 202, internal context(s) 204, and/or external context(s) 206. For example, driver state and/or context information 230 could be a score, a rating, a percentage, a word, a color, an emoji, an emoticon, a symbol, an icon, and/or a phrase that represents driver state(s) 202, internal context(s) 204, and/or external context(s) 206. As another example, driver state and/or context information 230 could include visualizations (e.g., charts, graphs) of certain specific driver state parameters (e.g., cognitive load, emotional load, stress level, heart rate, pulse). In some embodiments, driver monitoring application 150 and conferencing assistance application 152 can be combined.

As used herein, a "teleconference" is any gathering of two or more parties (e.g., two or more persons) for exchange and articulation of information, for collaboration, or for any other communication between the parties, where the parties are remote from one another (e.g., one party is remote from the other parties, each party is remote from the other parties, etc.) but the parties are linked together by a telecommunications system (e.g., network 160, such as a telephony network, the Internet, etc.). A "teleconference session" is a specific instance of such a teleconference. In various embodiments, a person who is participating in a teleconference session is concurrently driving a vehicle or a person who is requested to join a teleconference session while driving a vehicle. Accordingly, conferencing assistance application 152 can provide conferencing assistance services to communicate driver state and/or context information 230 in teleconference sessions and/or respond to teleconference requests (e.g., incoming phone call, incoming video call, incoming invitation to join a teleconference) while the driver is driving the vehicle.

Conferencing assistance application 152 can present driver state and/or context information 230 to persons other than the driver of the vehicle via text, graphics, and/or audio. In some embodiments, conferencing assistance application 152 can transmit 234 driver state and/or context information 230 in any of number of modalities during a teleconference session. Examples of those modalities include, without limitation, a dashboard-style user interface, audible feedback (e.g., a generated voice conveying the information via speech, sound effects, a non-speech tone that changes speed depending on the information, weather sounds), ambient alerting (e.g., a light that changes color depending on the information), text and/or graphics injected into the teleconference session (e.g., text injected into a text chat associated with the teleconference session, text showing a party status in a teleconference user interface). A number of these modalities are further described below in conjunction with FIGS. 3 and 4.

Further, conferencing assistance application 152 can respond 232 to incoming teleconference requests on behalf of the driver based on driver state(s) 202, internal context(s) 204, and/or external context(s) 206. For example, conferencing assistance application 152 can determine that, based on driver state(s) 202, internal context(s) 204, and/or external context(s) 206, a cognitive load of the driver is above a threshold when an incoming teleconference request (e.g., a video chat call, a phone call). Based on the cognitive load being above the threshold, conferencing assistance application 152 can automatically accept or reject the request without direct intervention by the driver. Depending on the user configuration of conferencing assistance application 152, conferencing assistance application 152 can convey or not convey driver state and/or context information 230 to the party making the teleconference request. Further details regarding responding to teleconference request are described below in conjunction with FIGS. 5A-5B.

In various embodiments, as noted above, conferencing assistance application 152 can generate driver state and/or context information 230 based on driver state(s) 202, internal context(s) 204, and/or external context(s) 206. Driver state and/or context information 230 can be a summary, condensation, aggregation, translation, visualization, and/or a reformatting of driver state(s) 202, internal context(s) 204, and/or external context(s) 206 into an expression suitable for presentation. For example, conferencing assistance application 152 can determine a driver distraction or absorption score or rating (e.g., a value, a percentage) based on a cognitive load and an emotional load of the driver; the driver distraction or absorption rates a distraction or absorption level of the driver based on the cognitive load and emotional load of the driver and represents a composite of the cognitive load and emotional load. As another example, conferencing assistance application 152 can generate speech data that vocalizes driver state and/or context information 230. Conferencing assistance application 152 can generate driver state and/or context information 230 from driver state(s) 202, internal context(s) 204, and/or external context(s) 206 using any technically feasible technique, including but not limited to lookup tables, mappings, formulas, or algorithms (e.g., an algorithm for computing a composite driver distraction score from the cognitive load and the emotional load, an algorithm for computing an emotional load score from various biometric values and parameters).

In some embodiments, conferencing assistance application 152 can interface with other applications to provide conferencing assistance services. The other applications can reside in computing device 180, another device paired with computing device 180, or at a remote device. The other applications can include, for example and without limitation, a conferencing application (e.g., a video conference application), a telephony application, or a personnel monitoring application. Conferencing assistance application 152 can interface with the other applications via respective application programming interfaces and optionally via network 160. Conferencing assistance application 152 can, via interfacing with another application, transmit 234 driver state and/or context information 230 to teleconference sessions that use that another application and/or respond 232 to incoming teleconference requests received by that another application. Conferencing assistance application 152 can, via a network 160, transmit 234 driver state and/or context information 230 to a remote system hosting a teleconference session, where the remote system forwards driver state and/or context information 230 to one or more other devices in the teleconference session. In some other embodiments, conferencing assistance application 152 can be integrated within another application (e.g., within a video conference application).

In some embodiments, conferencing assistance application 152 determines whether other people associated with the teleconference session (e.g., other people participating in the teleconference session, the person making the teleconference request to the driver) are approved or disapproved to receive driver state and context information 230 associated with the driver. Conferencing assistance application 152 can determine such approvals based on one or more of a whitelist and/or blacklist configurable by a user (e.g., the driver), or prompts to the driver to approve or disapprove a person. In some embodiments, conferencing assistance application 152 suppresses transmission of driver state and context information 230 associated with the driver if at least one other person associated with the teleconference session is disapproved to receive driver state and context information 230 associated with the driver. In some other embodiments, conferencing assistance application 152 transmits driver state and context information 230 associated with the driver if at least one other person associated with the teleconference session is approved to receive driver state and context information 230 associated with the driver. In some further embodiments, conferencing assistance application 152 transmits driver state and context information 230 to approved people and suppresses transmissions to disapproved people, or otherwise causes driver state and context information 230 to be presented to approved people and suppresses presentation to disapproved people.

Figure 3:
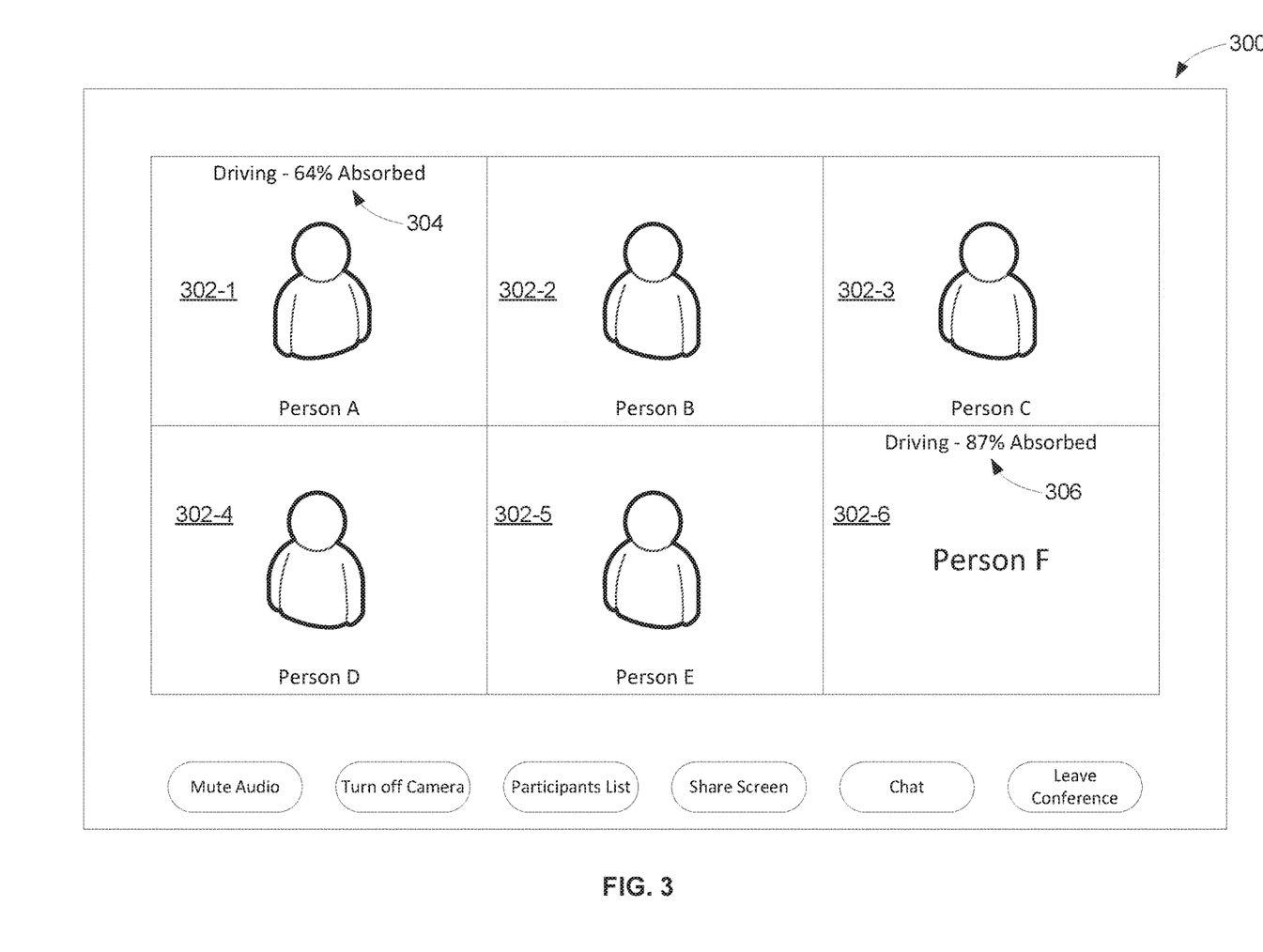
FIG. 3 illustrates an example teleconferencing user interface that includes information indicating driver states of one or more people participating in a teleconference, according to various embodiments.

FIG. 3 illustrates an example teleconferencing user interface 300 that includes information indicating driver states of one or more people participating in a teleconference, according to various embodiments. Teleconferencing user interface 300 may be a user interface displayed by a video conferencing application during an active teleconference session. Teleconferencing user interface 300 can include windows or regions 302 showing the people participating in the teleconference session. For example, as shown in FIG. 3 teleconferencing user interface 300 includes regions 302-1 thru 302-6 showing a number of people participating in the teleconference session. Furthermore, if one or more of the people are driving a vehicle while participating in the teleconference session, driver state and context information 230 associated with those people can be show in teleconferencing user interface 300. Driver state and context information 230 can be provided by conferencing assistance application 152 operating in conjunction with (e.g., interfacing with) the video conferencing application. Accordingly, in region 302-1, driver state information 304 indicating a driving status and absorption rating is displayed for Person A. In region 302-6, driver state 306 information a driving status and absorption rating is displayed for Person F. Driver state information 304 and 306 communicate the driver states of Person A and Person F, respectively, to the other people in the teleconference session, so that the people in the teleconference are aware that Person A and Person F may be distracted from the teleconference session. In some embodiments, a user can select a region 302 (e.g., by clicking or tapping on the region 302). In response to the selection, conferencing assistance application 152 can cause to be displayed a dashboard or the like (e.g., dashboard 400 described below in conjunction with FIG. 4) that displays additional driver state and context information 230 associated with the user corresponding to the selected region 302. For example, a user can select region 302-6, and in response to the selection conferencing assistance application 152 would cause a dashboard with driver state and context information 230 for Person F to be displayed.

Figure 4:
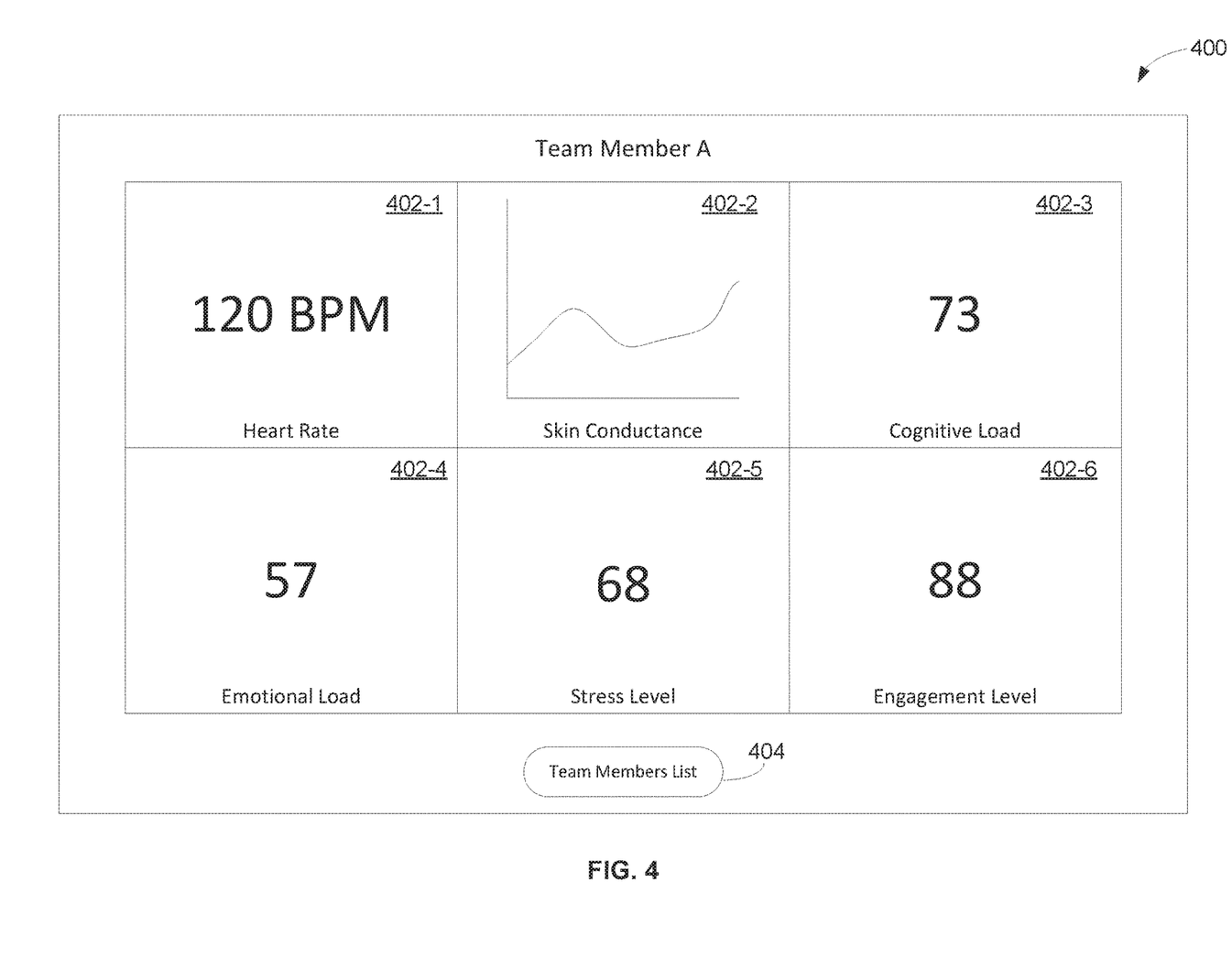
FIG. 4 illustrates an example dashboard for monitoring the state and context of a party to a teleconference, according to various embodiments.

FIG. 4 illustrates an example dashboard 400 for monitoring the state and context of a party to a teleconference, according to various embodiments. In various embodiments, conferencing assistance application 152 can provide driver state and context information 230 into a personnel monitoring application on another device via network 160. The personnel monitoring application at the other device can have a dashboard 400, which is a user interface that can present driver state and context information 230 for multiple people (e.g., participants in a teleconference, team members in communication with each other and/or with a central coordinator). As shown, dashboard 400 includes windows or regions 402-1 thru 402-6 presenting various driver state and/or context parameters for each driver. The parameters can include numerical values or scores, and charts or graphs. For example, region 402-1 shows a current heart rate of a driver, and region 402-2 shows a chart of the skin conductance of the driver over a period of time. Regions 402-3 thru 402-6 shows values or scores rating the cognitive load, emotional load, stress level, and engagement level, respectively, of the driver. The values or scores, and charts and graphs, shown in dashboard 400 can be updated as updated driver state and context information 230 is received by the personnel monitoring application from conferencing assistance application 152. Dashboard 400 further includes a "Team Member List" button 404. A user can activate button 404 (e.g., click or tap on button 404 to select button 404) to open a list of people for which driver state and context information 230 can be displayed in dashboard 400. The user can select a person from the list, and in response conferencing assistance application 152 populates regions 402 with driver state and/or context parameters for the selected person.

Figure 5A:
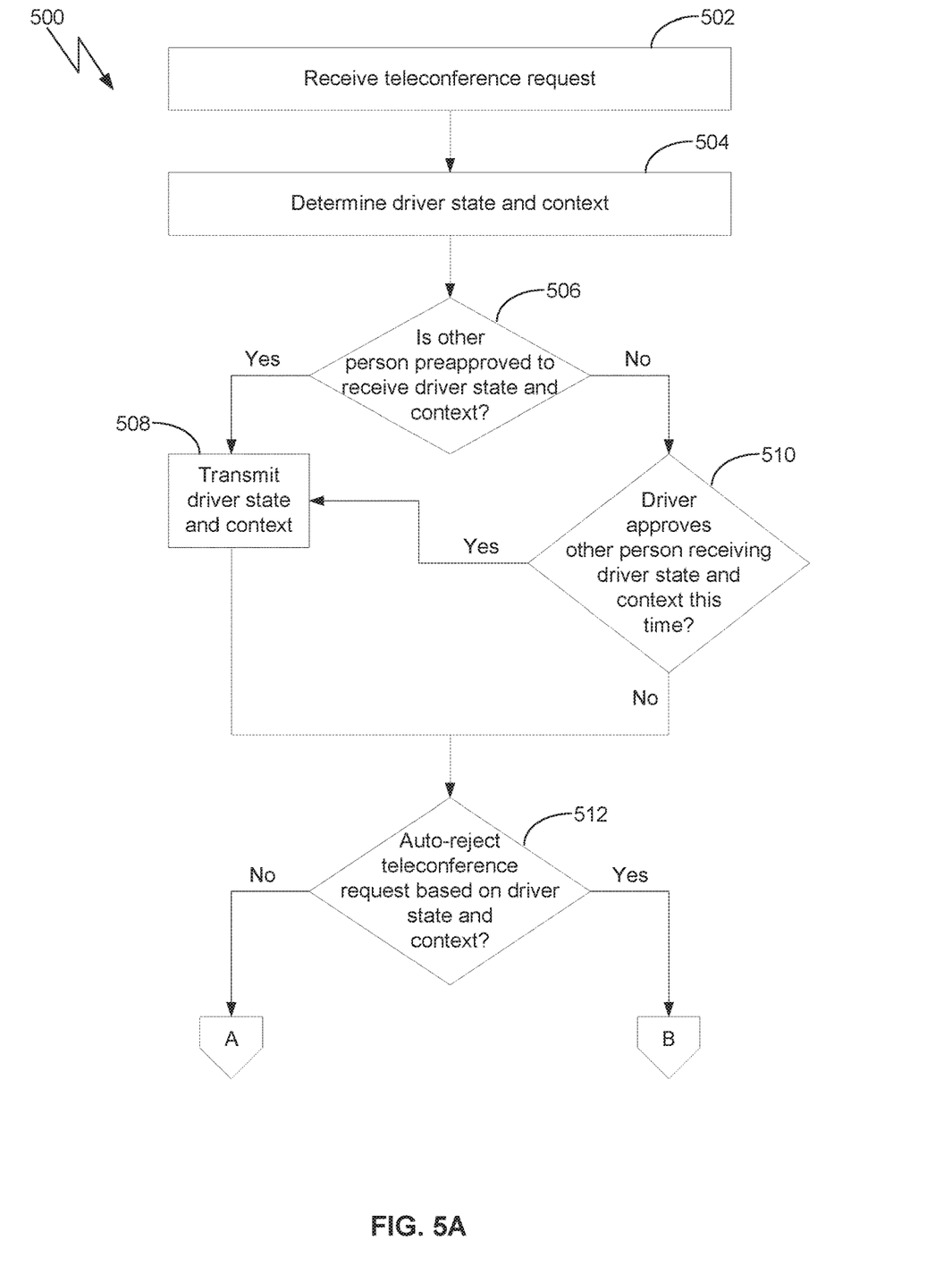
FIGS. 5A-5B illustrate a flow diagram of process steps for communicating driver state and context information in response to a teleconference request, according to various embodiments.
Figure 5B:
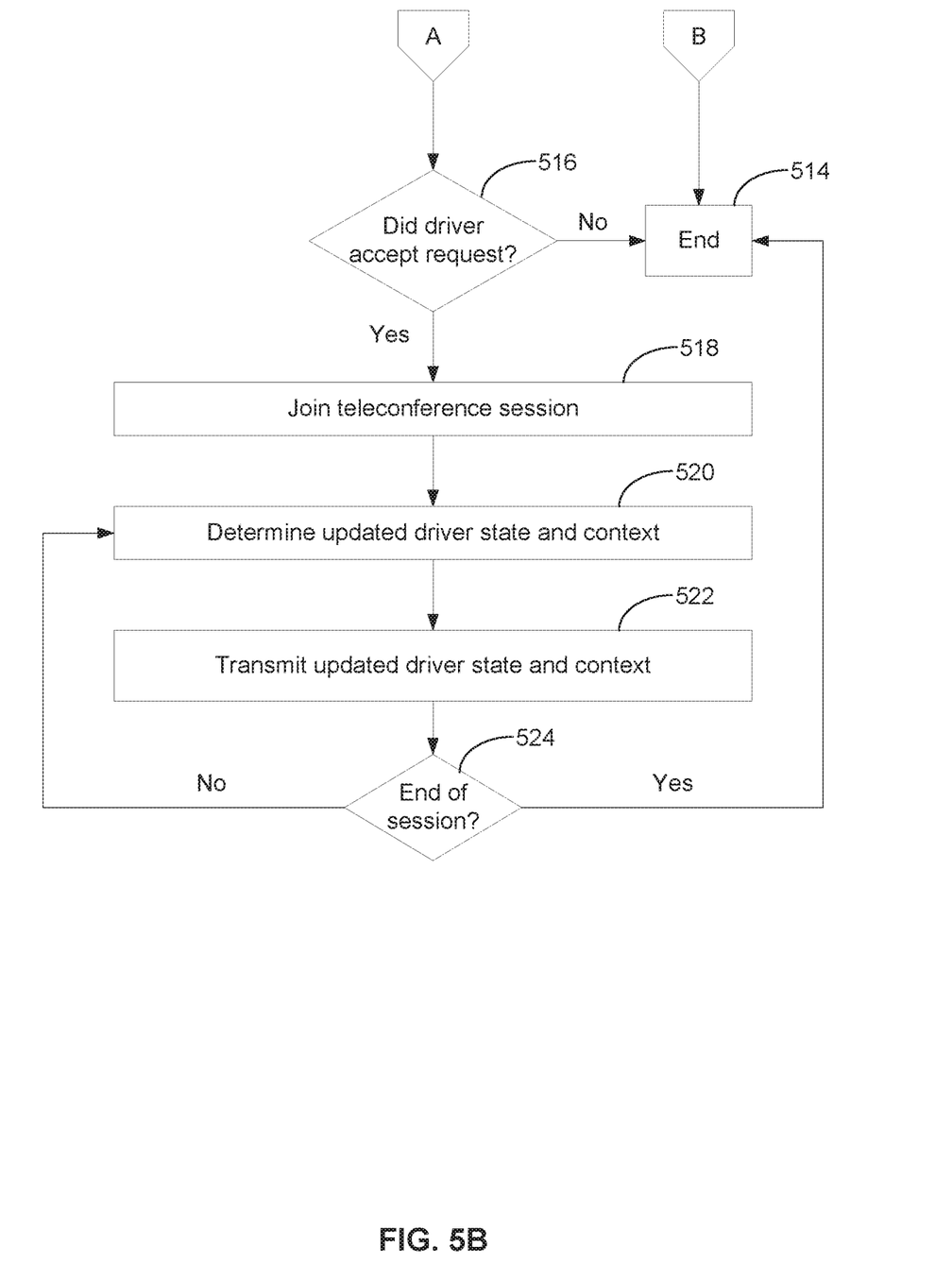

FIGS. 5A-5B illustrate a flow diagram of process steps for communicating driver state and context information 230 in response to a teleconference request, according to various embodiments. FIGS. 5A-5B illustrate a process 500 in which computing device 180 responds to a teleconference request using driver state and context information 230 (and/or driver state(s) 202, internal context(s) 204, and/or external context(s) 206) and transmits driver state and context information 230 to other people in the teleconference.

As shown, at step 502, computing device 180 receives a teleconference request. For example, computing device 180 could receive an incoming phone call, an incoming video chat, or an incoming invitation to join a teleconference session. Conferencing assistance application 152 can receive the request in conjunction with another application to which the request is directed (e.g., telephony application, video conferencing application).

At step 504, computing device 180 determines a driver state and context. Driver monitoring application 150 can receive sensor data 222 from sensor array 120 and determine driver state(s) 202, internal context(s) 204, and/or external context(s) 206 based on sensor data 222. Driver monitoring application 150 transmits driver state(s) 202, internal context(s) 204, and/or external context(s) 206 to conferencing assistance application 152. Conferencing assistance application 152 can determine driver state and/or context information 230 based on driver state(s) 202, internal context(s) 204, and/or external context(s) 206.

At step 506, computing device 180 determines if the other person (i.e., the person that made the request received in step 502) is approved to receive driver state and/or context information 230. In some embodiments, conferencing assistance application 152 can be configured by a user (e.g., the driver of the vehicle) to include a list of other people that are preapproved to receive driver state and/or context information 230.

If the other person is preapproved, then at step 508 computing device 180 transmits driver state and/or context information 230 to the other person, informing the other person of the current driver state and context of the driver of the vehicle. Conferencing assistance application 152 can transmit driver state and/or context information 230 to a device of the other person via network 160 (e.g., audio signals that audibly indicates driver state and/or context information 230 and can be output at the other device, driver state and/or context information 230 that can be displayed on a display of the other device). Process 500 then proceeds to step 512.

If the other person is not preapproved, then at step 510, computing device 180 determines whether the driver is willing to approve whether the other person can receive driver state and/or context information 230 for the current teleconference. For example, conferencing assistance application 152 could prompt the driver to approve or deny the other person from receiving driver state and/or context information 230 this one time. If the other person is not approved by the driver to receive driver state and/or context information 230, then process 500 proceeds to step 512. If the other person is approved by the driver, then process 500 proceeds to step 508, where computing device 180 (e.g., conferencing assistance application 152) transmits driver state and/or context information 230 to the other person, as described above, and then process 500 proceeds to step 512.

At step 512, computing device 180 determines whether to reject the request received at step 502 on behalf of the driver based on driver state and/or context information 230, in order to prevent the driver from being additionally burdened with participation in a teleconference concurrently with driving the vehicle. For example, conferencing assistance application 152 can automatically reject an incoming request if a distraction level, cognitive load, an emotional load, and/or the like of the driver exceeds a threshold. As another example, conferencing assistance application 152 can automatically reject an incoming request if the vehicle is located at a location where the driver experiences a distraction level, cognitive load, an emotional load, and/or the like that exceeds a threshold. If conferencing assistance application 152 determines that the request should be automatically rejected, then process 500 proceeds to step 514, where process 500 ends (e.g., conferencing assistance application 152 rejects the request and transmits information indicating such to the other device, conferencing assistance application 152 simply ignores the request). If conferencing assistance application 152 determines that the request should not be automatically rejected, then process 500 proceeds to step 516.

At step 516, computing device 180 determines whether the driver has accepted the request. If the request was not automatically rejected, the driver can manually accept or reject the request. If the driver rejected the request (e.g., declined the call or invitation to join), then process 500 proceeds to step 514, where process 500 ends. If the driver accepted the request, then process 500 proceeds to step 518, where computing device 180 joins the teleconference session. Conferencing assistance application 152 can join the session in conjunction with another application to which the request is directed (e.g., the conferencing application).

At step 520, computing device 180 determines an updated driver state and context. For example, driver monitoring application 150 can receive updated sensor data 222 from sensor array 120 and determine updated driver state(s) 202, internal context(s) 204, and/or external context(s) 206 based on updated sensor data 222. Driver monitoring application 150 transmits updated driver state(s) 202, internal context(s) 204, and/or external context(s) 206 to conferencing assistance application 152. Conferencing assistance application 152 can determine updated driver state and/or context information 230 based on updated driver state(s) 202, internal context(s) 204, and/or external context(s) 206. In some embodiments, steps 506, 508, and 510 can be performed after step 520 instead of or in addition to being performed after step 504 as shown. That is, after the teleconference request has been accepted, conferencing assistance application 152 can determine whether driver state and/or context information 230 is to be transmitted to any of the other persons in the teleconference based on whether the other person is approved by the driver to receive driver state and/or context information 230 of the driver.

At step 522, computing device 180 can transmit updated driver state and/or context information 230 to the other person or other people participating in the teleconference. Conferencing assistance application 152 can transmit updated driver state and/or context information 230 to the device of the other person or people via network 160, similar to transmission of driver state and/or context information 230 in step 508 above.

At step 524, computing device 180 determines if the session has ended. If the session has not ended, then process 500 proceeds back to step 520, where computing device 180 determines an updated driver state and context. If the session has ended, then process 500 proceeds to step 514, where process 500 ends.

As described in FIGS. 3-5B above, conferencing assistance application 152 can provide driver state and/or context information 230 in various modalities to inform other people participating in the teleconference of the driver state and context and/or relieve the driver of being burdened with a teleconference session while driving the vehicle. Other modalities are within the scope of the disclosed embodiments. For example, driver state and/or context information 230 could include a word or phrase indicating the driver state and/or context, and the word or phrase can be presented similarly as a value (e.g., displayed on a display, vocalized in speech). Conferencing assistance application 152 can inject audio vocalizing or otherwise indicating driver state and/or context information 230 in the audio of the teleconference session (e.g., output audio signals vocalizing driver state and/or context information 230 into the audio stream of the teleconference session, output non-speech audio tones conveying driver state and/or context information 230 via a speed of the tones). Additionally or alternatively, conferencing assistance application 152 can input text and/or graphics indicating driver state and/or context information 230 into a chat associated with the teleconference session. Further additionally or alternatively, conferencing assistance application 152 can command another device to convey driver state and/or context information 230 visually (e.g., via ambient lighting at that another device that change color or a rate that a color changes depending on the driver state and/or context).

In some embodiments, conferencing assistance application 152 can automatically accept the teleconference request based on driver state and context information 230, as well as automatically reject a teleconference request. For example, conferencing assistance application 152 can automatically reject the teleconference request, as described above, or automatically accept the teleconference request. Conferencing assistance application 152 can automatically accept the teleconference request if the distraction level, cognitive load, an emotional load, and/or the like of the driver is below a second threshold. The second threshold may be the same as or different than the threshold described above with respect to automatically rejecting the teleconference request in step 512. If the second threshold is a different threshold, and the distraction level or the like is between the two thresholds, then conferencing assistance application 152 can allow the driver to manually accept or reject the teleconference request, as in step 516 above.

Figure 6:
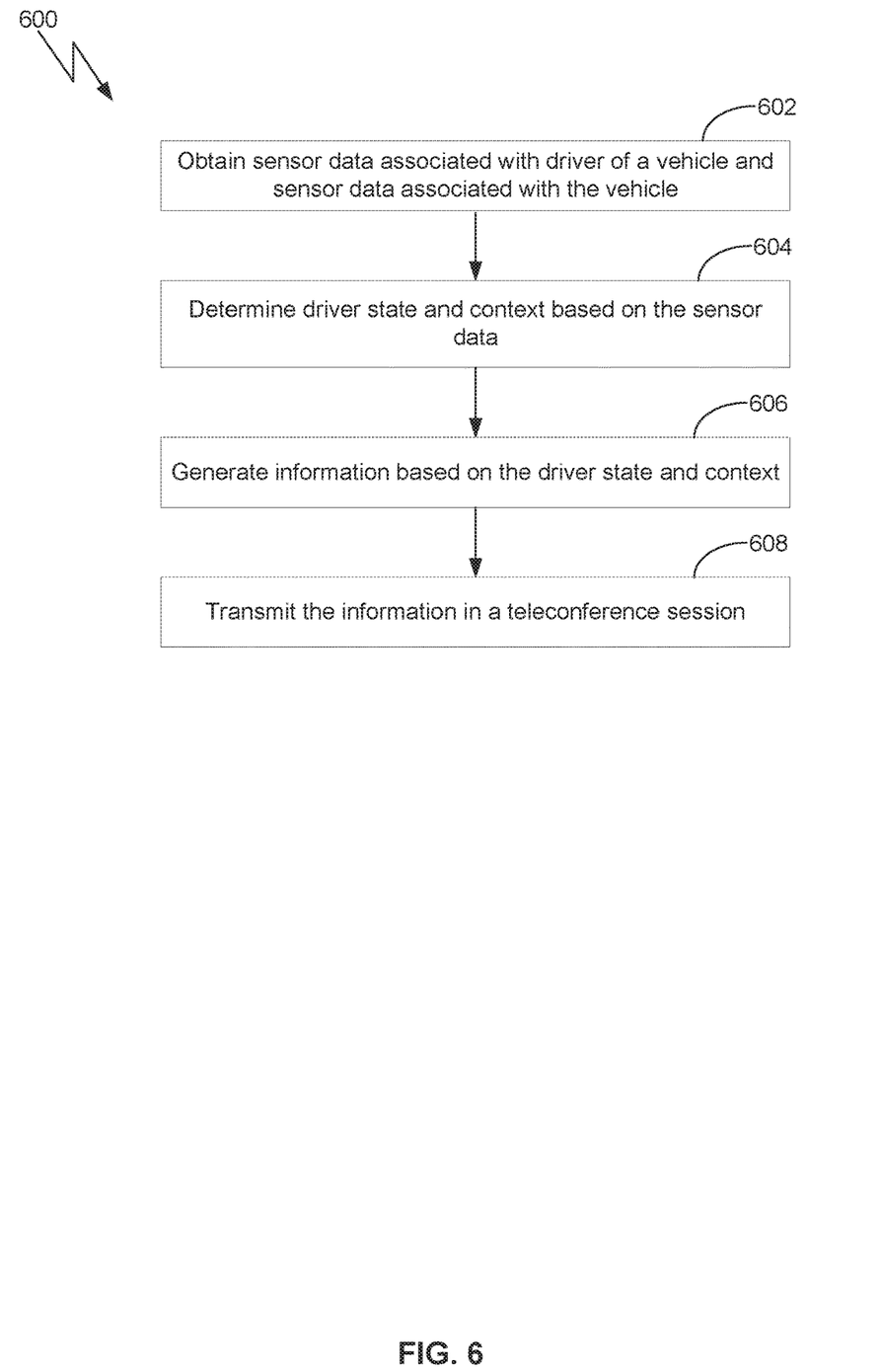
FIG. 6 is a flow diagram of method steps for communicating driver state and context information in a teleconference, according to various embodiments.

FIG. 6 is a flow diagram of method steps for communicating driver state and context information in a teleconference, according to various embodiments. Although the method steps are described with respect to the systems of FIGS. 1-5B, persons skilled in the art will understand that any system configured to perform the method steps, in any order, falls within the scope of the various embodiments.

As shown, method 600 begins at step 602, where computing device 180 obtains sensor data associated with a driver of a vehicle and sensor data associated with the vehicle. Computing device 180 (e.g., driver monitoring application 150) obtains sensor data 222 from sensor array 120 of a vehicle. Sensor data 222 can include biometric data of a driver of the vehicle, as well as sensor data monitoring a cabin of the vehicle and optionally an external environment of the vehicle.

At step 604, computing device 180 determines a driver state and context based on the sensor data. Driver monitoring application 150 can determine driver state 202, internal context(s) 204, and/or external context(s) 206 based on sensor data 222.

At step 606, computing device 180 generates information based on the driver state and context. Conferencing assistance application 152 can determine driver state and context information 230 based on driver state 202, internal context(s) 204, and/or external context(s) 206.

At step 608, computing device 180 transmits the information in a teleconference session. Conferencing assistance application 152 can transmit driver state and context information 230 in an ongoing teleconference session. For example, conferencing assistance application 152 could transmit driver state and context information 230 to a remote computing system hosting the teleconference session, and the remote computing system could transmit driver state and context information 230 to devices associated with parties in the teleconference session for display on the devices.

In sum, the disclosed techniques may be used to provide teleconferencing capabilities that can account for and/or communicate information based on the state and context of a person participating in a teleconference who is concurrently driving a vehicle. A computing system obtains sensor data from a sensor array monitoring the driver of the vehicle, and also the cabin of the vehicle and optionally other occupants of the vehicle. Optionally the computing system also obtains sensor data from a sensor array monitoring the environment outside of the vehicle. The computing system determines a driver state and/or context based on the sensor data. The computing system may communicate information based on the driver state and/or context in a variety of modalities. In some embodiments, information based on the driver state and/or context may be communicated in response to an incoming teleconference request as well as during the teleconference.

At least one advantage and technological improvement of the disclosed techniques is that information indicating state and/or context of a person participating in a teleconference who is also concurrently driving a vehicle can be automatically communicated to other people participating in the teleconference. Accordingly, the other people can adjust expectations for the teleconference or abort the teleconference based on the information. Another advantage and improvement is that incoming teleconference requests can be automatically accepted or rejected based on the driver state and/or context, thus allowing the driver to focus on driving the vehicle without the additional burden of having to decline an incoming teleconference request.

1. In some embodiments, a computer-implemented method comprises obtaining sensor data associated with a driver of a vehicle; determining a state associated with the driver based on the sensor data; and transmitting the state associated with the driver to a teleconference session, wherein the driver is at least one of a participant or an invitee to the teleconference session.

2. The method of clause 1, wherein the state associated with the driver comprises at least one of a cognitive load, an emotional load, or a biometric parameter associated with the driver.

3. The method of clauses 1 or 2, further comprising determining a context associated with a cabin of the vehicle.

4. The method of any of clauses 1-3, wherein the context associated with the cabin of the vehicle comprises at least one of occupants in the cabin or activity in the cabin.

5. The method of any of clauses 1-4, wherein determining the state associated with the driver comprises determining the state associated with the driver further based on the context associated with the cabin.

6. The method of any of clauses 1-5, further comprising determining a context associated with an environment exterior to the vehicle.

7. The method of any of clauses 1-6, wherein the context associated with the environment exterior to the vehicle comprises at least one of traffic density level, weather, or a location of the vehicle.

8. The method of any of clauses 1-7, wherein determining the state associated with the driver comprises determining the state associated with the driver further based on the context associated with the environment exterior to the vehicle.

9. The method of any of clauses 1-8, wherein the state associated with the driver comprises a value representing a distraction level or an absorption level associated with the driver.

10. The method of any of clauses 1-9, wherein transmitting the state associated with the driver to the teleconference session comprises transmitting the state associated with the driver to a remote system hosting the teleconference session, wherein the remote system is configured to transmit the state associated with the driver to devices associated with one or more people participating in the teleconference session.

11. In some embodiments, a system comprises one or more sensor devices associated with a vehicle; a memory storing an application; and a processor that, when executing the application, is configured to obtain sensor data associated with a driver of a vehicle from the one or more sensor devices; determine a state associated with the driver based on the sensor data; and transmit the state associated with the driver to a teleconference session, wherein the driver is at least one of a participant or an invitee to the teleconference session.

12. The system of clause 11, wherein the processor, when executing the application, is further configured to obtain second sensor data associated with a cabin of the vehicle from the one or more sensor devices; determine a context associated with the cabin of the vehicle based on the second sensor data; and determine the state associated with the driver further based on the context associated with the cabin.

13. The system of clauses 11 or 12, wherein the processor, when executing the application, is further configured to obtain third sensor data associated with an environment exterior to the vehicle from the one or more sensor devices; determine a context associated with the environment exterior to the vehicle based on the third sensor data; and determine the state associated with the driver further based on the context associated with the environment exterior to the vehicle.

14. The system of any of clauses 11-13, wherein the processor, when executing the application, is further configured to receive a teleconference request associated with the teleconference session; and accept the teleconference request based on the state associated with the driver.

15. The system of any of clauses 11-14, wherein the processor, when executing the application, is further configured to receive a teleconference request associated with the teleconference session; and reject the teleconference request based on the state associated with the driver.

16. The system of any of clauses 11-15, wherein transmitting the state associated with the driver to the teleconference session comprises determining that other people in the teleconference session are approved to receive the state associated with the driver.

17. In some embodiments, one or more non-transitory computer-readable storage media include instructions that, when executed by one or more processors, cause the one or more processors to perform the steps of obtaining sensor data associated with a driver of a vehicle; determining a state associated with the driver based on the sensor data; receiving a teleconference request; and responding to the teleconference request based on the state associated with the driver.

18. The one or more non-transitory computer-readable storage media of clause 17, wherein responding to the teleconference request comprises transmitting the state associated with the driver to a device associated with a person making the teleconference request.

19. The one or more non-transitory computer-readable storage media of clauses 17 or 18, wherein the steps further comprise joining a teleconference session associated with the teleconference request; and transmitting the state associated with the driver to the teleconference session.

20. The one or more non-transitory computer-readable storage media of any of clauses 17-19, wherein responding to the teleconference request comprises automatically rejecting the teleconference request based on the state associated with the driver.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
obtaining sensor data associated with a driver of a vehicle;
determining a state associated with the driver based on the sensor data;
determining whether one or more participants of a teleconference session are approved to receive the state associated with the driver, wherein the driver is at least one of a participant or an invitee to the teleconference session hosted by a remote system; and
upon determining that the one or more participants are approved to receive the state, transmitting the state associated with the driver to the remote system for forwarding the state to the one or more participants of the teleconference session.

2. The method of claim 1, wherein the state associated with the driver comprises at least one of a cognitive load, an emotional load, or a biometric parameter associated with the driver.

3. The method of claim 1, further comprising determining a context associated with a cabin of the vehicle.

4. The method of claim 3, wherein the context associated with the cabin of the vehicle comprises at least one of occupants in the cabin or activity in the cabin.

5. The method of claim 3, wherein the step of determining the state associated with the driver comprises determining the state associated with the driver further based on the context associated with the cabin.

6. The method of claim 1, further comprising determining a context associated with an environment exterior to the vehicle.

7. The method of claim 6, wherein the context associated with the environment exterior to the vehicle comprises at least one of traffic density level, weather, or a location of the vehicle.

8. The method of claim 6, wherein the step of determining the state associated with the driver comprises determining the state associated with the driver further based on the context associated with the environment exterior to the vehicle.

9. The method of claim 1, wherein the state associated with the driver comprises a value representing a distraction level or an absorption level associated with the driver.

10. A system, comprising:
one or more sensor devices associated with a vehicle;
a memory storing an application; and
a processor that, when executing the application, is configured to:
obtain sensor data associated with a driver of the vehicle from the one or more sensor devices;
determine a state associated with the driver based on the sensor data;
determine whether one or more participants of a teleconference session are approved to receive the state associated with the driver, wherein the driver is at least one of a participant or an invitee to the teleconference session hosted by a remote system; and
upon determining that the one or more participants are approved to receive the state, transmit the state associated with the driver to the remote system for forwarding the state to the one or more participants of the teleconference session.

11. The system of claim 10, wherein the processor, when executing the application, is further configured to:
obtain second sensor data associated with a cabin of the vehicle from the one or more sensor devices;
determine a context associated with the cabin of the vehicle based on the second sensor data; and
determine the state associated with the driver further based on the context associated with the cabin.

12. The system of claim 10, wherein the processor, when executing the application, is further configured to:
obtain third sensor data associated with an environment exterior to the vehicle from the one or more sensor devices;
determine a context associated with the environment exterior to the vehicle based on the third sensor data; and
determine the state associated with the driver further based on the context associated with the environment exterior to the vehicle.

13. The system of claim 10, wherein the processor, when executing the application, is further configured to:
receive a teleconference request associated with the teleconference session; and
accept the teleconference request based on the state associated with the driver.

14. The system of claim 10, wherein the processor, when executing the application, is further configured to:
receive a teleconference request associated with the teleconference session; and
reject the teleconference request based on the state associated with the driver.

15. The system of claim 10, wherein the step of transmitting the state associated with the driver to the teleconference session comprises determining that other people in the teleconference session are approved to receive the state associated with the driver.

16. One or more non-transitory computer-readable storage media including instructions that, when executed by one or more processors, cause the one or more processors to perform the steps of:
obtaining sensor data associated with a driver of a vehicle;
determining, based on the sensor data, a state associated with the driver;
receiving a teleconference request; and
in response to the teleconference request:
automatically joining a teleconference session associated with the teleconference request when the state associated with the driver is equal to or below a threshold, and
automatically rejecting the teleconference request when the state associated with the driver is above the threshold.

17. The one or more non-transitory computer-readable storage media of claim 16, wherein the step of responding to the teleconference request comprises transmitting the state associated with the driver to a device associated with a person making the teleconference request.

18. The one or more non-transitory computer-readable storage media of claim 16, wherein the steps further comprise determining a context associated with at least one of a cabin of the vehicle or an environment exterior to the vehicle, wherein the step of determining the state associated with the driver comprises determining the state associated with the driver further based on the context associated with the cabin.

19. The one or more non-transitory computer-readable storage media of claim 16, wherein the state associated with the driver comprises an absorption level associated with the driver.

\* \* \* \* \*